US012179193B2

(12) United States Patent
Huang et al.

(10) Patent No.: US 12,179,193 B2
(45) Date of Patent: Dec. 31, 2024

(54) PLANAR APPARATUS FOR VOLUMETRIC BODY FLUID COLLECTION AND MANUFACTURING METHOD THEREOF

(71) Applicant: TAI-SAW Technology Co., Ltd., Taoyuan (TW)

(72) Inventors: Yi-Qi Huang, Taoyuan (TW); Wei-Yi Hsu, Taoyuan (TW); Pei-Tzu Hung, Taoyuan (TW); Szu-Heng Liu, Taoyuan (TW); Yu-Tung Huang, Taoyuan (TW)

(73) Assignee: TAI-SAW Technology Co., Ltd., Taoyuan (TW)

( * ) Notice: Subject to any disclaimer, the term of this patent is extended or adjusted under 35 U.S.C. 154(b) by 580 days.

(21) Appl. No.: 16/990,567

(22) Filed: Aug. 11, 2020

(65) Prior Publication Data

US 2021/0197190 A1 Jul. 1, 2021

(30) Foreign Application Priority Data

Dec. 31, 2019 (TW) ................................ 108148733

(51) Int. Cl.

*B01L 1/00* (2006.01)
*B01L 3/00* (2006.01)

(52) U.S. Cl.

CPC ..... *B01L 3/50273* (2013.01); *B01L 3/502707* (2013.01); *B01L 2200/0684* (2013.01); *B01L 2200/12* (2013.01); *B01L 2200/16* (2013.01); *B01L 2300/14* (2013.01); *B01L 2400/0487* (2013.01)

(58) Field of Classification Search

CPC .......... B01L 3/50273; B01L 3/502707; B01L 2200/0684; B01L 2200/12; B01L 2200/16; B01L 2300/14; B01L 2400/0487; B01L 2200/0605; B01L 2300/0681; B01L 2300/0816; B01L 2300/0887

See application file for complete search history.

(56) References Cited

U.S. PATENT DOCUMENTS

2018/0345288 A1* 12/2018 Belotserkovsky .... F04B 19/006
2020/0030792 A1* 1/2020 Kirakossian ......... G01N 33/491

* cited by examiner

*Primary Examiner* — Jyoti Nagpaul
(74) *Attorney, Agent, or Firm* — Volpe Koenig

(57) ABSTRACT

A planar volumetric device for quantifying and handling a body fluid sample is provided. The device has a planar main body, a body fluid sample flow path, an air pump and an air passage. The planar main body includes a first planar surface and a second planar surface. The body fluid sample flow path is disposed in the main body, and has a body fluid sample inlet, a middle junction and a body fluid sample outlet, wherein the middle junction and the body fluid sample outlet define therebetween a specific path segment, by which it is possible to externally observe to which extent the body fluid sample has filled up with the path segment. The air pump is configured to provide an operating air pressure. The air passage has a first end and a second end, wherein the first and the second ends are connected to the air pump and the middle junction respectively, and the specific path segment has a constant volume.

8 Claims, 5 Drawing Sheets

PLANAR APPARATUS FOR VOLUMETRIC BODY FLUID COLLECTION AND MANUFACTURING METHOD THEREOF

CROSS-REFERENCE TO RELATED APPLICATION AND CLAIM OF PRIORITY

The application claims the benefit of Taiwan Patent Application No. 108148733, filed on Dec. 31, 2019, at the Taiwan Intellectual Property Office, the disclosures of which are incorporated herein in its entirety by reference.

FIELD OF THE INVENTION

The present invention is related to a device for collecting a body fluid sample, and more particularly to a planar apparatus for volumetric body fluid collection and a manufacturing method thereof.

BACKGROUND OF THE INVENTION

A dropper is a tool often used in the laboratory to collect body fluid samples. A traditional dropper, such as a nipple dropper, is composed of a glass or transparent plastic tube with an approximately circular cross-section and an elastic rubber spherical element with one end as a manual pneumatic pump. The structure of such a device is simple and easy to manufacture, but it is difficult to control the amount of liquid samples collected and delivered. Some biochemical analyses require volumetric body fluid sample collection to provide basic data on specific physiological parameters regarding concentration or the amount per unit volume. A traditional dropper cannot be used for volumetric collection, so it is not suitable for volumetric body fluid sample collection.

Please refer to FIG. 1, which shows a conventional improved dropper 10 that can be used to volumetrically collect body fluid samples. According to the figure, the improved dropper 10 has a nipple-shaped balloon 11 of an ordinary dropper, which can be regarded as a manual air pumping element. The two ends of the air passage 12 are connected to the balloon 11 and the body fluid sample collection bladder 13 respectively, and a sample drawing flow channel 14 is disposed at the other side above the body fluid sample collection bladder 13. When in use, it operates like a normal nipple dropper. After holding the balloon 11 by the fingers to squeeze out the air inside, the user can move the modified dropper 10 and take advantage of the atmospheric pressure to allow the body fluid sample 1 to enter the sample extraction channel 14. The excessive body fluid sample 1 will overflow into the body fluid sample collection bladder 13 so that the sample extraction channel 14 is kept in a full state. When the user squeezes the balloon 11 again, the excessive body fluid sample 1 can be kept in the body fluid sample collection bladder 13, so that a body fluid sample 1 of a fixed volume in the sample extraction channel 14 can be obtained, and thus an effect of volumetric collection is realized.

However, in order to achieve the effect of volumetric collection during the operation of the modified dropper 10 described above, it is inevitable that the additional sample stored in the body fluid sample collection bladder 13 will be wasted. In addition, this type of product is basically tubular in shape, has a certain thickness, and occupies significant storage space. Moreover, the design concept of this dropper is a single function device, and it cannot be provided with other extra functions such as filtering and screening or configuring to detect the reaction substance in the flow channel.

Therefore, how to avoid the above disadvantages is a technical problem that needs to be solved.

SUMMARY OF THE INVENTION

In accordance with one aspect of the present invention, a planar volumetric device for quantifying and handling a body fluid sample is provided. The device has a planar main body, a body fluid sample flow path, an air pump and an air passage. The planar main body includes a first planar surface and a second planar surface. The body fluid sample flow path is disposed in the main body, and has a body fluid sample inlet, a middle junction and a body fluid sample outlet, wherein the middle junction and the body fluid sample outlet define therebetween a specific path segment, by which it is possible to externally observe to which extent the body fluid sample has filled up the path segment. The air pump is configured to provide an operating air pressure. The air passage has a first end and a second end, wherein the first and the second ends are connected to the air pump and the middle junction respectively, and the specific path segment has a constant volume.

In accordance with another aspect of the present invention, a method for manufacturing a planar volumetric device is provided. The method comprises steps of: providing a transparent upper plate; providing a lower plate; providing a middle plate including a body fluid sample flow path space having a body fluid sample inlet location and a body fluid sample outlet location, an air passage space and a junction located at an intersection of the body fluid sample flow path space and air passage space, wherein an area of the body fluid sample flow path space from the junction to the body fluid sample outlet location forms a volumetric passage space; and sequentially stacking the lower plate, the middle plate and the upper plate to manufacture the planar volumetric device.

In accordance with yet another aspect of the present invention, a planar volumetric device for quantifying and handling a body fluid sample is provided. The device comprises an air pump configured to provide an operating air pressure, a first planar surface and a second planar surface opposite to and cooperating with the first planar surface to form the planar volumetric device, and forming therebetween: a body fluid sample flow path having a body fluid sample inlet, a middle passage and a body fluid sample outlet; and an air passage having a first end and a second end, and intersecting with the body fluid sample flow path at the middle passage. The first end is connected to the air pump, the body fluid sample outlet serves as the second end, the air passage and the body fluid sample flow path share a common region defining a volumetric passage for the body fluid sample to have a specific passage length, by which it is possible to externally observe to which extent the body fluid sample has filled up with the specific passage length.

The planar volumetric device for quantifying and handling a body fluid sample and manufacturing method proposed by the present invention allows the user to observe the degree of accumulation of the body fluid sample within the specific distance, and the operator can use the air pump to timely take out the volumetric body fluid sample to reduce waste of the body fluid sample. In addition, the configuration is simple, and can be easily equipped with other functional elements such as filtering and screening elements or configuring reaction substances in the flow channel to form a simple micro laboratory function. It is easy to store and transport, so it has industrial utilization.

The objectives and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

Body fluids collected from a living body are often used as analytical samples to judge the living body's physiology as well as health condition. Samples used for biochemical analysis usually need to be processed previously. For example, when the biochemical parameters of plasma in blood need to be analyzed, other components such as blood cells or blood platelets in the blood sample need to be removed in advance. Furthermore, blood samples need to be collected in a volumetric manner when determining the concentration of specific chemical components.

Figure 1:
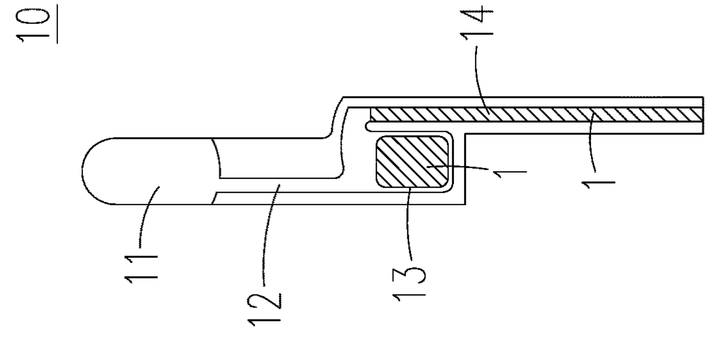
FIG. 1 is a schematic diagram showing a modified dropper for volumetric body fluid collection according to the prior art.
Figure 2A:
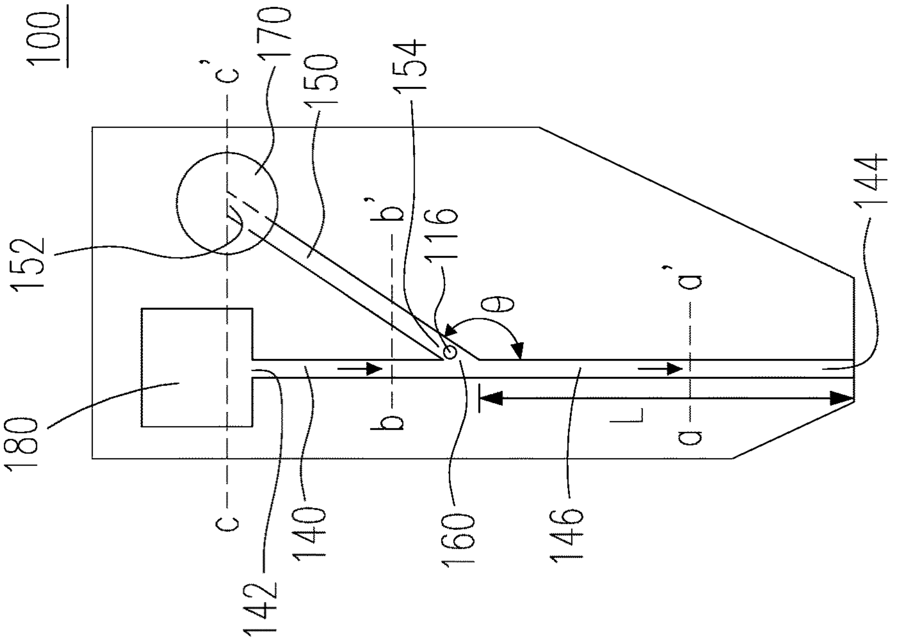
FIGS. 2A and 2B are schematic diagrams showing planner apparatus for volumetric body fluid sample collection according to two embodiments of the present invention.
Figure 3A:
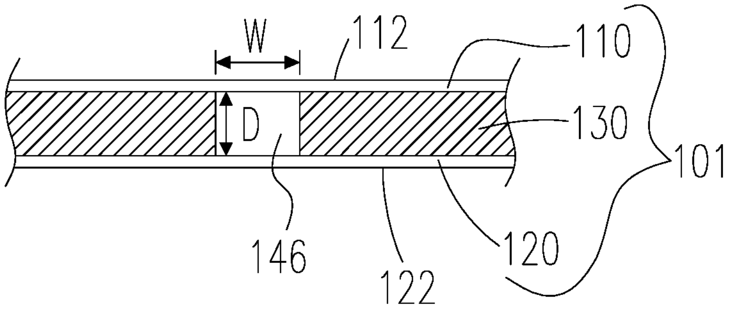
FIGS. 3A-3C are cross-sectional schematic views of the body fluid sample collection device in FIG. 2A at the positions of the dotted lines a-a', b-b' and c-c'.
Figure 3B:
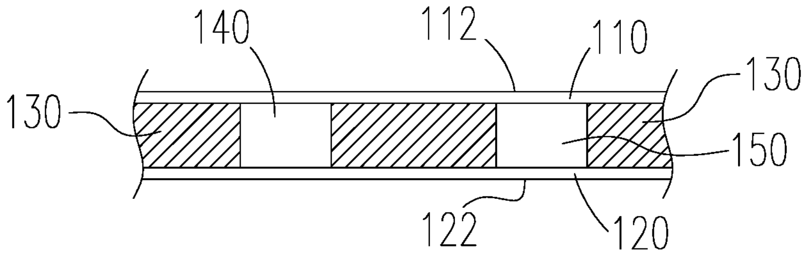
Figure 3C:
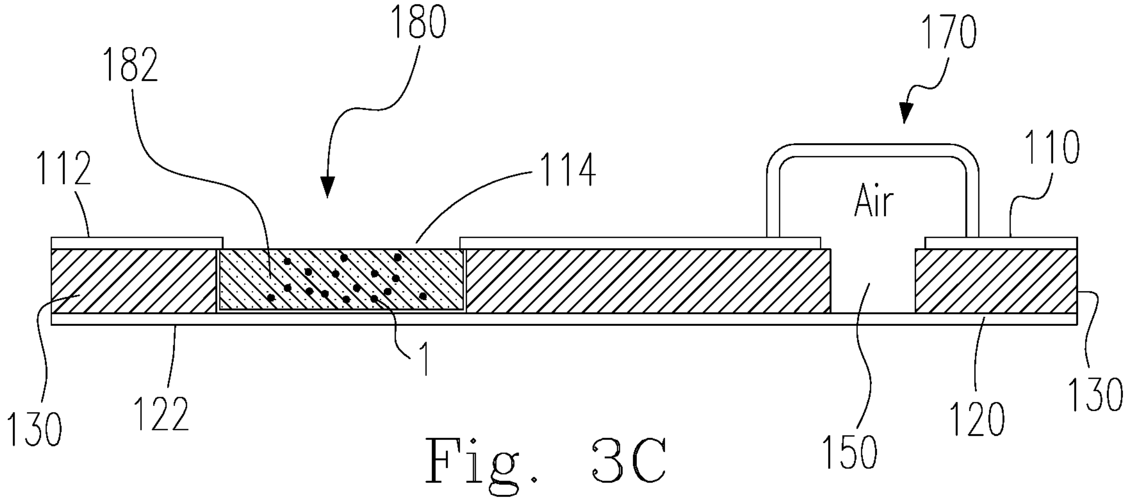

Please refer to FIG. 2A, which illustrates an embodiment of a planner apparatus for volumetric body sample collection according to the present invention. FIGS. 3A-3C are cross-sectional schematic views of the body fluid sample collection device in FIG. 2A at the positions of the dotted lines a-a', b-b' and c-c'. As shown in the illustrations, the main body 101 of the body fluid sample collection device 100 has a planar-shaped outline, and includes a pair of oppositely disposed first planar surfaces 112 and second planar surfaces 122. The first planar surface 112 and the second planar surface 122 are parallel to each other, and a body fluid sample flow path 140, an air passage 150, and a junction 160 are arranged between. The body fluid sample flow path 140 and the air passage 150 are basically located on the same layer, parallel to the first planar surface 112 and the second planar surface 122.

The first plane surface 112 is an operation plane. According to an embodiment, the first plane surface 112 may be equipped with an air pump 170 for providing operating air pressure and a sample carrying element 180 for carrying the body fluid sample 1. The body fluid sample flow path 140 has a body fluid sample inlet 142 and a body fluid sample outlet 144, and the body fluid sample inlet 142 is connected to the sample carrying element 180. The first end 152 of the air passage 150 is connected to the air pump 170 that provides the operating air pressure. The junction 160 is located at the other end of the air passage 150, that is, the intersection of the second end 154 and the body fluid sample flow path 140. When the user provides operating air pressure through the air pump 170 to enter the air passage 150, the body fluid sample 1 present in the volumetric path 146 can be pushed by the operating air pressure and leave the body fluid sample collection device 100 from the body fluid sample outlet 144.

It can be understood from the figure that the specific distance L between the body fluid sample flow path 140 from the junction 160 to the body fluid sample outlet 144 can make the path 146 a volumetric one, and an angle θ is formed between the volumetric portion of the body fluid sample flow path 140 and the air passage 150. According to an embodiment of the present invention, in order to prevent the body fluid sample 1 from entering the air passage 150 from the body fluid sample flow path 140 via the junction 160, the angle θ should be greater than 90 degrees, that is to say the angle θ is an obtuse angle.

According to an embodiment, in order to prevent the body fluid sample 1 in the body fluid sample flow channel 140 from flowing through the junction 160 into the air passage 50, a vent hole 116 can be provided at the position of the junction 160 near the air passage 150 to stop the capillary effect in the air passage 150, so the body fluid sample 1 will not be affected by the capillary force and flow into the air passage 150. The planar-type volumetric body fluid sample collection device 100 equipped with the vent hole 116 allows all the filtered body fluid samples 1 to be confined in the body fluid sample flow path 140, which is helpful for the accuracy in terms of volume control.

Figure 2B:
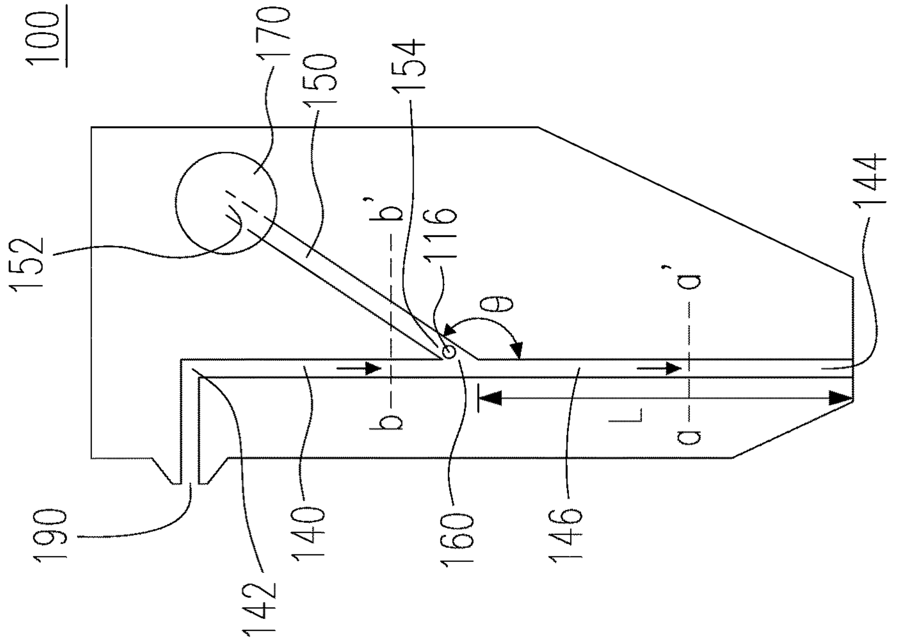

FIG. 2B illustrates another embodiment of a planner apparatus for volumetric body sample collection according to the present invention. Compared with that of FIG. 2A, the difference in the embodiment as shown in FIG. 2B is that the body fluid sample 1 can be input from the external inlet 190, and all the other elements as well as functions are the same. Therefore, there is no need to repeat.

Referring again to FIG. 3A, according to an embodiment of the present invention, the basic structure of the body fluid sample collection device 100 can be composed of an upper plate 110, a lower plate 120, and a middle plate 130. The upper plate 110 has a transparent property at least at the portion along the quantitative volume channel 146, or can be entirely transparent, so that the operator or user can visually observe the flow state of the body fluid sample in the body fluid sample flow path 140 or the degree of accumulation within the specific distance L. The volumetric path 146 has a width of W and a height of D. Therefore, the total volume of volumetric path 146 is fixed at L×W×D. The height D of the volumetric path 146 may be determined by the thickness of the middle plate 130. Designers can adjust the size of L according to practical needs to determine the volume of the volumetric path 146 in the body fluid sample collection device 100, so that the volume of body fluid collected every time is virtually the same.

Based on the illustrations of FIGS. 3A-3C, those skilled in the art can understand that the height D of both the body fluid sample flow path 140 and the air passage 150 disposed in the body fluid sample collection device 100 is equivalent to the thickness of the middle plate 130, and the relative positions of the sample carrying element 180 and the air pump 170 at the upper plate 110 also correspond to those at the middle plate 130 on which the body fluid sample flow channel 140 and the air channel 150 are arranged.

Referring again to FIG. 3C, the sample carrying element 180 and the air pump 170 are disposed on the first planar surface 112 of the upper plate 110. A filter membrane 182 for screening the body fluid 1 can be disposed in the sample carrying element 180. According to an embodiment, the filter membrane 182 has a profile similar to that of the sample carrier element 180, and can be filled in the open space of the middle plate 130 corresponding to where the sample carrying element 180 is disposed. The body fluid sample 1 may enter through the opening 114 above the sample carrying element 180, and be temporarily absorbed by the filter membrane 182 of the sample carrying element 180. The filter membrane 182 can retain blood cells and other cells in the body fluid sample 1, and the filtered body fluid sample 1 is moved to the body fluid sample flow path 140 due to gravity, capillary force or molecular force.

The air passage 150 is directly connected to and disposed below the air pump 170. When a user (not shown) squeezes the button housing 172 of the air pump 170 by hand, the volume of the air pump 170 shrinks and the air pressure inside the air pump 170 rises. The air in the air pump 170 flows along the air passage 150 in the direction of the junction 160 (not shown) to form an operating air pressure. According to an embodiment, the body fluid sample 1 can be collected from a person to be examined, and the plasma after passing through the filter membrane 182 enters the body fluid sample flow path 140. In different embodiments, the body fluid sample 1 may also be gastric fluid, saliva, lymph fluid, or urine. In addition to the manual air pressure button described above, the embodiment of the air pump 170 may also be a self-powered electric air pump.

Figure 4A:
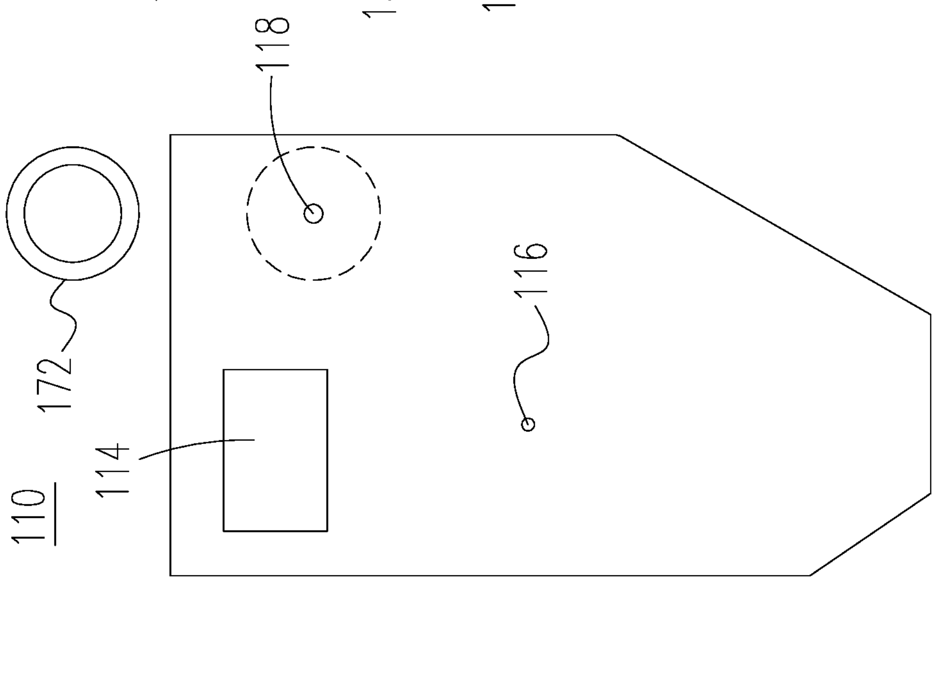
FIGS. 4A-4C are schematic diagrams showing the main components constituting the structure in the embodiment shown in FIG. 2A.
Figure 4B:
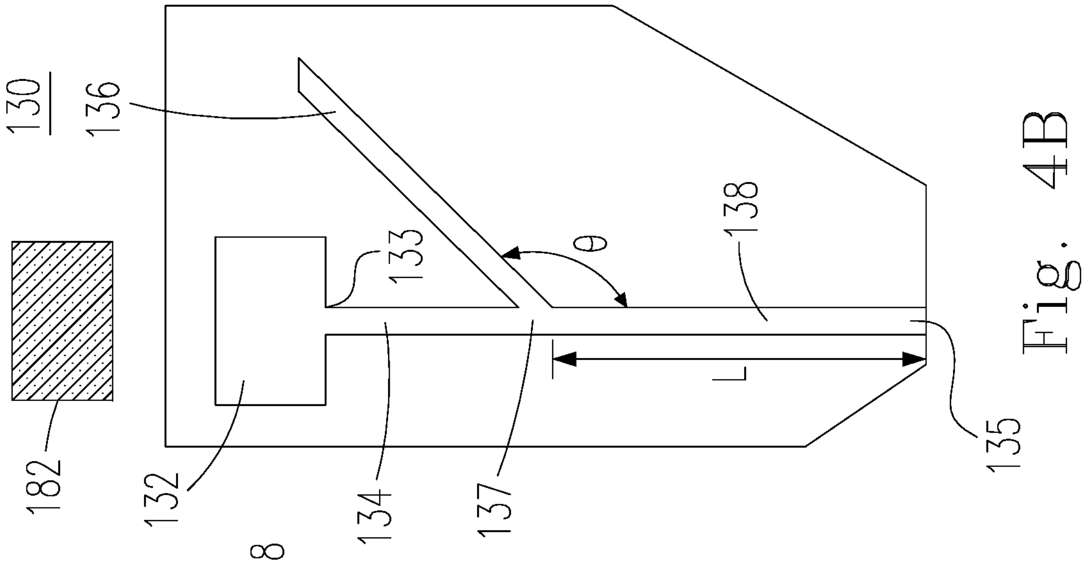
Figure 4C:
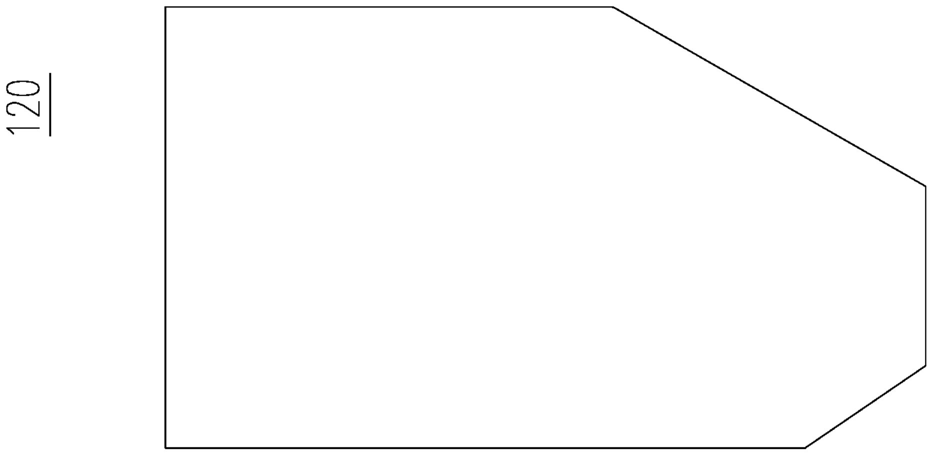

Please refer to FIGS. 4A-4C, which respectively show the individual outlines and features of the upper plate 110, the lower plate 120, and the middle plate 130 and other components in the embodiments described above. Among the three plates, at least the upper plate 110 and the lower plate 120 have the same external contour, so when the upper plate 110, the middle plate 130, and the lower plate 120 are sequentially stacked, the planar-typed main body 101 of the volumetric body fluid sample collection device 100 in FIG. 2A is formed.

The opening 114 on the upper plate 110 corresponds to the outline and location of the opening 132 on the middle plate 130, and is configured to provide a mounting space for the sample carrying element 180. The size of the opening 114 on the upper plate 110 may be smaller than that of the opening 132 on the middle plate 130. After the filter membrane 182 is disposed in the opening 132 of the middle plate 130, the upper plate 110 is placed, and thus the filter membrane 182 is restricted at the position of the sample carrying element 180. A pump through hole is located at the position corresponding to one end of the air passage space 136 of the middle plate 130, which is the position of the air pump 170, and is configured to be combined with the flexible button housing 172 so as to form the manual air pump 170. The remaining spaces on the middle plate 130 such as the body fluid path space 134, the air passage spaces 136 and the junction opening 137 define the positions of the body fluid sample path 140, the air passage 150 and the junction 160, respectively.

According to one embodiment, the vent hole 116 can be disposed on the upper plate 110. In other embodiments, the vent hole 116 can be disposed on the lower plate 120. The volumetric passage space 138 has a first longitudinal direction, the air passage space 136 has a second longitudinal direction, and the first and the second longitudinal directions form an angle θ which is an obtuse angle.

According to FIGS. 4A-4C, the present invention provides a method for making a planar volumetric device, which includes the following steps: providing an upper plate 110 with transparent properties; providing a lower plate 120; providing a middle plate 130; and sequentially stacking the lower plate 120, the middle plate 130 and the upper flat plate 110 in order to form the planar volumetric device 100. The middle plate 130 has a body fluid sample flow path space 134, an air passage space 136, and a junction 137 located at the intersection of the air passage space 136 and the body fluid sample flow path space 134. The body fluid sample path space 134 has a body fluid inlet location 133 and a body fluid outlet location 135. The body fluid sample path space 134 has a specific distance L from the junction 137 to the body fluid outlet location 135, forming a volumetric passage space 138.

Based on the illustrations in FIGS. 4A-4C, it can be understood that the main body 101 of the planar volumetric body fluid sample collection device 100 of the present invention can be formed by using a simple combination of three-layer flat plate 110, 120, 130. If a person wants to produce a body fluid collection device for a different specific volume, he only needs to replace the middle layer 130, and the upper plate 110 and the lower plate 120 do not need to be changed. Therefore, the concept of the present invention can make the production and installation processes simple with low cost and has flexibility in selection as well.

Figure 5A:
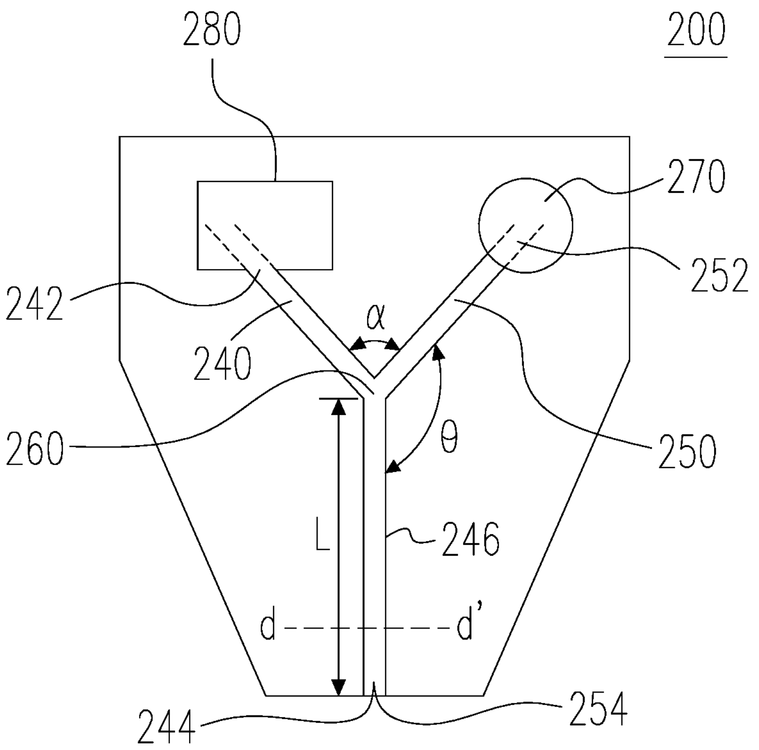
FIG. 5A is a schematic diagram of another embodiment of the planner apparatus for volumetric body sample collection of the present invention.
Figure 5B:
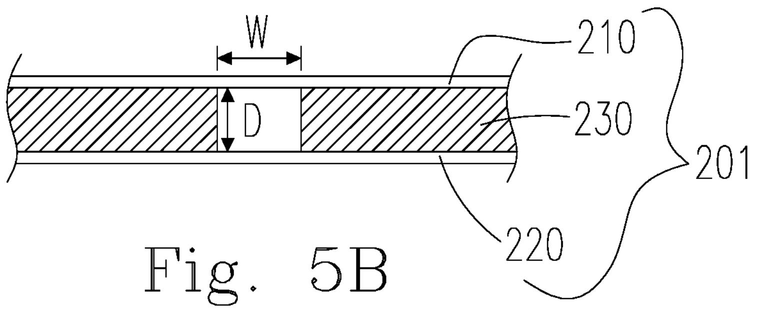
FIG. 5B is a cross-sectional schematic diagram of the body fluid sample collection device in FIG. 5A at the position of the dotted line d-d'.

Please refer to FIG. 5A, which shows another embodiment of the planar volumetric body fluid sample collection device of the present invention. FIG. 5B is a schematic cross-sectional view of the body fluid sample collection device 200 in FIG. 5A. As shown in the figure, the planar volumetric body fluid sample collection device 200 includes an upper plate 210, a lower plate 220 and a middle flat plate 230, the three of which constitute a main body 201. The upper plate 210 has a transparent property. The lower plate 220 and the upper plate 210 have the same outline, the two are closely combined, and a body fluid sample flow path 240 and an air passage 250 are formed therebetween. The body fluid sample flow passage 240 has a body fluid sample inlet 242 and a body fluid sample outlet 244. The air passage has a first end 252 connected to an air pump 270 providing a pressure and a second end 254 located at the same position of the body fluid sample outlet 244. The air passage 250 and the body fluid sample flow path 240 have a common area with a specific distance L starting from the fork 260, and this common area corresponds to the volumetric passage 246.

An angle θ is formed between the volumetric passage 246 and a portion of the air passage 250 near the first end 252. The air passage 250 and the body fluid sample flow path 240 form another angle α before the junction 260. According to an embodiment of the present invention, in order to prevent the body fluid sample 1 from entering the body fluid sample flow path 240 into a section of the air channel 250 closer to the first end 252 through the junction 260, the angle θ should be greater than 90 degrees, that is, the angle θ is an obtuse angle. According to another embodiment of the present invention, for the same reason, the angle α should be an acute angle which is less than 90 degrees.

The volumetric passage 246 has a specific distance L, a width W, and a height D. Therefore, the volume of the volumetric passage 246 is fixed at L×W×D. The height D of the volumetric passage 246 can be determined by the thickness of the middle plate 230. The designer can adjust the size of L according to the actual specific needs to determine the volume of the volumetric passage 246 in the body fluid sample collection device 200, so that the volume of body fluid collected at each time is a constant.

Figure 6:
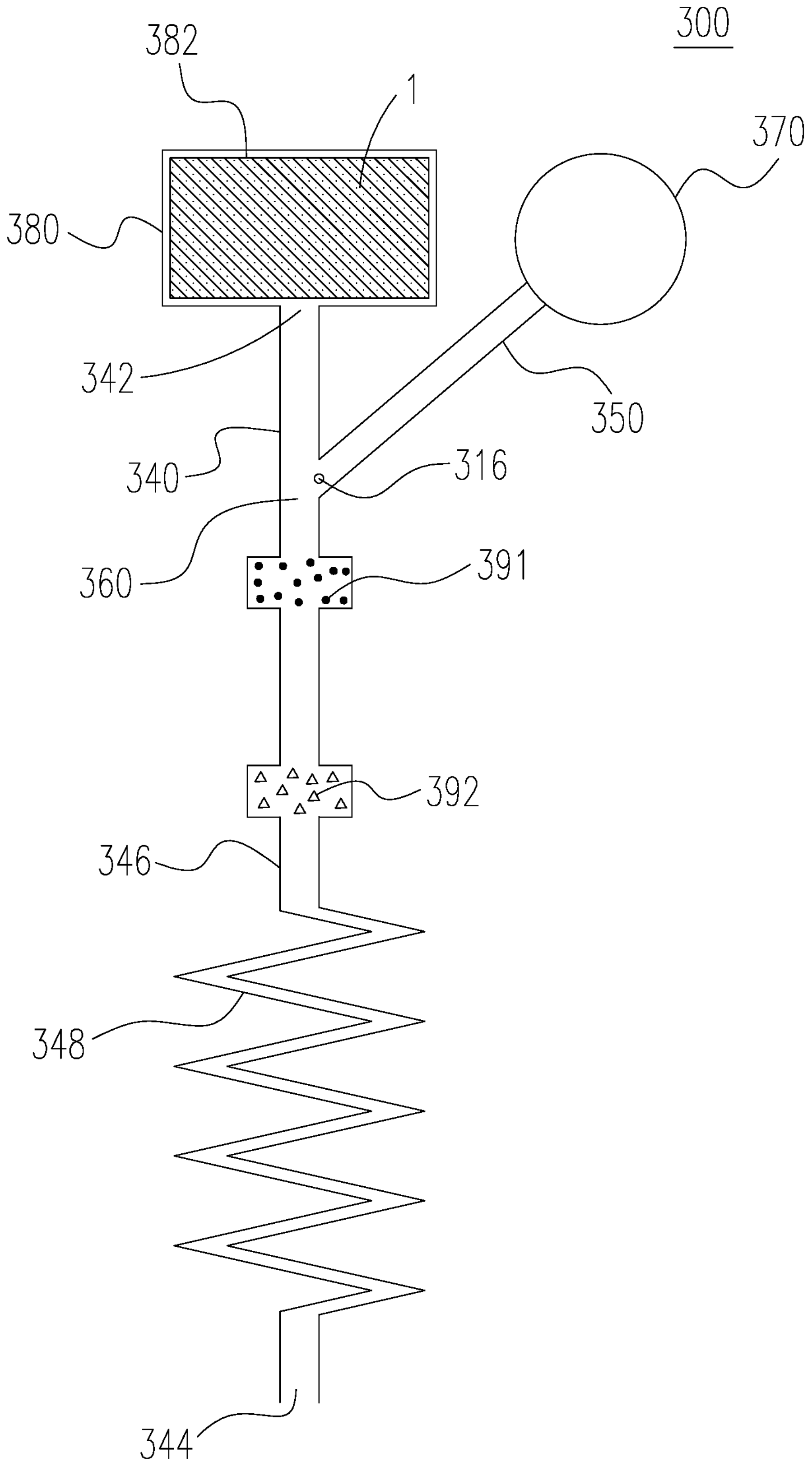
FIG. 6 is a schematic diagram showing a planner apparatus for volumetric body sample collection according to yet another embodiment of the present invention.

Please refer to FIG. 6, which shows another embodiment of the planar volumetric body fluid sample collection device of the present invention. The body fluid sample collection device 300 can be configured on a plane, and has a body fluid sample flow path 340, an air passage 350 and a junction 360. The body fluid sample flow path 340 has a body fluid sample inlet 342 connected to a sample carrying element 380 and a body fluid sample outlet 344. A volumetric passage 346 is formed between the junction 360 and the body fluid sample outlet 344. According to an embodiment, a filter membrane 382 is disposed in the sample carrying element 380, which can filter the body fluid sample 1. One end of the air passage 350 is connected to an air pump 370 that provides operating air pressure. When a user provides operating air pressure to the air passage 350 by operating the air pump 370, the body fluid sample (not shown) present in the volumetric passage 346 can be pushed by the operating air pressure and exit from the body fluid sample outlet 344. In one embodiment, a vent hole 316 can be provided at the position of the junction 360 near the air passage 350 to stop the capillary effect in the air passage 350, so the body fluid sample 1 will not be affected by the capillary force and flow into the air passage 350.

The concept of the element configuration shown in FIG. 6 is similar to those of the previous embodiments, so the details will not be repeated. The volumetric passage 346 has a rear end path 348 that is multiple curved or polygonal curved. Due to gravity or capillary phenomena or molecular forces, any body fluid sample 1 entering the body fluid sample flow path 340 will flow downward in the figure, that is, in the direction of the arrow in FIG. 2. According to an embodiment, a first reaction material 391 and a second reaction material 392 are sequentially arranged on the volumetric passage channel 346 along the flow direction of the body fluid sample 1. The first reactive material 391 is, for example, a reagent that can react with a specific chemical substance in the body fluid. The second reaction material 392 is, for example a display agent that can be used to make it easy to identify whether the first reaction material 391 reacts with the specific chemical substance via color reaction. When necessary, special optical equipment can be used to help identification. For example, the blood glucose concentration test or the biological detection of drug components in body fluid can be easily performed using the device of the present invention without relying on centrifuges or other large-scale equipment. It is good news for those living in remote areas or under home care programs. The first reactive material 391 and the second reactive material 392 may also be biochemical reagents that are not related to each other and respectively indicate the presence or absence of different types of chemical substances in the body fluid.

In different embodiments, the portion of the volumetric passage 346 for configuring the reaction material 391,392 has a larger width, which is beneficial to the storage of the reaction material 391/392 and the reaction with the body fluid sample 1. According to another embodiment, the width of the rear end path 348 in the volumetric passage 346 that is multiple curved or polygonal curved is smaller, which can cause turbulence or convection when the body fluid sample passes the turning points, which helps the sample and the reaction material 391, 392 to mix well and fully react.

Through the above-mentioned embodiments, the planar volumetric apparatus provided by the present invention can volumetrically collect body fluid samples in the simplest way, is easy to manufacture and easy to store, and it is easy to add functions for other needs, which can be a major innovation in the art.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A planar volumetric device for quantifying and handling a body fluid sample, comprising:

a planar main body including a first planar surface and a second planar surface;

a body fluid sample flow path disposed in the main body, and having a body fluid sample inlet, a middle junction and a body fluid sample outlet being different from the body fluid sample inlet, wherein the middle junction and the body fluid sample outlet define therebetween a specific path segment, by which it is possible to externally observe to which extent the body fluid sample has filled up with the specific path segment;

an air pump having a button housing for being squeezed and configured to provide an operating air pressure; and an air passage having a first end and a second end, wherein the first and the second ends are connected to the air pump and the middle junction respectively, wherein:

the button housing is directly air communicated with the air passage;

the specific path segment has a third end and a fourth end, the third end is directly connected to the middle junction, and the fourth end is directly connected to the body fluid sample outlet;

a vent hole is disposed on the first planar surface along the air passage and adjacent to the middle junction, and located between the first end and the second end;

air in the button housing directly flows into the air passage to form the operating air pressure when the button housing of the air pump is squeezed; and the body fluid sample present in the specific path segment is directly pushed by the operating air pressure and leaves the planar volumetric device through the body fluid sample outlet.

2. The planar volumetric device according to claim 1, an acute angle larger than 0 degree is included between a first straight line extending along the air passage from the middle junction to the air pump and a second straight line extending from the middle junction to the body fluid sample inlet, and an obtuse angle is included between a third straight line extending along the air passage from the middle junction to the air pump and a fourth straight line extending from the middle junction to the body fluid sample outlet.

3. The planar volumetric device according to claim 1, wherein a volumetric passage is formed from the middle junction to the body fluid sample outlet, and is configured to contain a reagent.

4. A planar volumetric device for quantifying and handling a body fluid sample, comprising:
- an air pump having a button housing for being squeezed and configured to provide an operating air pressure;
- a first planar surface;
- a second planar surface opposite to and cooperating with the first planar surface to form the planar volumetric device, and forming therebetween:
  - a body fluid sample flow path having a body fluid sample inlet, a middle passage and a body fluid sample outlet being different from the body fluid sample inlet; and
  - an air passage having a first end and a second end, and intersecting with the body fluid sample flow path at the middle passage at a junction, wherein;
  - the button housing is directly air communicated with the air passage;
  - the first end is connected to the air pump, the body fluid sample outlet serves as the second end, the air passage and the body fluid sample flow path share a common region defining a volumetric passage for the body fluid sample to have a specific passage length, by which it is possible to externally observe to which extent the body fluid sample has filled up with the specific passage length;
  - the junction and the body fluid sample outlet define therebetween the volumetric passage; and
  - the air passage is configured so that:
  - air in the button housing directly flows into the air passage to form the operating air pressure when the button housing of the air pump is squeezed; and
  - the body fluid sample present in the volumetric passage is directly pushed by the operating air pressure and leaves the planar volumetric device through the body fluid sample outlet.

5. The planar volumetric device according to claim 4, wherein an obtuse angle is included between a third straight line extending along the air passage from the middle passage to the air pump and a fourth straight line extending from the middle passage to the body fluid sample outlet.

6. The planar volumetric device according to claim 4, wherein an acute angle larger than 0 degree is included between a first straight line extending along the air passage from the middle passage to the air pump and a second straight line extending from the middle passage to the body fluid sample inlet relation before the common region.

7. The planar volumetric device according to claim 4, wherein a vent hole is disposed on the first planar surface along the air passage and adjacent to the middle passage, and located between the first end and the second end.

8. The planar volumetric device according to claim 4, wherein the volumetric passage is configured to contain a reagent.

* * * * *